United States Patent
Heidrich et al.

(10) Patent No.: US 10,683,692 B2
(45) Date of Patent: Jun. 16, 2020

(54) CLUTCH MECHANISM BETWEEN LEADSCREW AND ELECTRIC MOTOR

(71) Applicant: Westinghouse Air Brake Technologies Corporation, Wilmerding, PA (US)

(72) Inventors: Peter Heidrich, Des Plaines, IL (US); Peter M. Giannis, Arlington Heights, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 388 days.

(21) Appl. No.: 15/521,684

(22) PCT Filed: Oct. 26, 2015

(86) PCT No.: PCT/US2015/057348
§ 371 (c)(1),
(2) Date: Apr. 25, 2017

(87) PCT Pub. No.: WO2016/069464
PCT Pub. Date: May 6, 2016

(65) Prior Publication Data
US 2017/0247930 A1     Aug. 31, 2017

Related U.S. Application Data

(60) Provisional application No. 62/069,953, filed on Oct. 29, 2014.

(51) Int. Cl.
*E05F 15/657* (2015.01)
*E05F 15/652* (2015.01)
(Continued)

(52) U.S. Cl.
CPC .......... *E05F 15/657* (2015.01); *E05F 15/603* (2015.01); *E05F 15/652* (2015.01);
(Continued)

(58) Field of Classification Search
CPC ..... E05F 15/603; E05F 15/652; E05F 15/657; F16H 25/02; F16H 2025/2071; F16D 11/10; F16D 11/14; F16D 23/12
See application file for complete search history.

(56) References Cited

U.S. PATENT DOCUMENTS

| | | | |
|---|---|---|---|
| 3,740,146 A * | 6/1973 | Wilharm | G03B 9/08 352/91 C |
| 4,605,108 A * | 8/1986 | Monot | E05F 15/652 477/8 |
| 6,032,416 A | 3/2000 | Springer et al. | |
| 6,334,276 B1 | 1/2002 | Marin-Martinod et al. | |

(Continued)

FOREIGN PATENT DOCUMENTS

| | | |
|---|---|---|
| CN | 1388021 A | 1/2003 |
| CN | 1408980 A | 4/2003 |

(Continued)

OTHER PUBLICATIONS

Examination Report for corresponding Indian Application No. 201747017888 dated Jan. 31, 2020.

*Primary Examiner* — Richard M Lorence
(74) *Attorney, Agent, or Firm* — Christopher R. Carroll; The Small Patent Law Group LLC

(57) ABSTRACT

A clutch mechanism for coupling and uncoupling an electric motor and leadscrew has dog-clutch gears that can be engaged by a linear actuator, bell crank, and linkage shaft. Uncoupling force due to narrowed dog teeth are resisted by the alignment of the linkage shaft with the central portion of the bell crank.

4 Claims, 5 Drawing Sheets

(51) Int. Cl.
*E05F 15/603* (2015.01)
*F16D 11/14* (2006.01)
*F16D 23/12* (2006.01)
*F16H 1/20* (2006.01)
*F16H 25/20* (2006.01)

(52) U.S. Cl.
CPC ............ *F16D 11/14* (2013.01); *F16D 23/12* (2013.01); *F16H 1/20* (2013.01); *F16H 25/20* (2013.01); *E05Y 2201/214* (2013.01); *E05Y 2201/216* (2013.01); *E05Y 2201/246* (2013.01); *E05Y 2201/462* (2013.01); *E05Y 2201/626* (2013.01); *E05Y 2201/636* (2013.01); *E05Y 2201/68* (2013.01); *E05Y 2201/716* (2013.01); *E05Y 2800/11* (2013.01); *E05Y 2900/51* (2013.01); *F16D 2023/123* (2013.01); *F16H 2025/2071* (2013.01)

(56) References Cited

U.S. PATENT DOCUMENTS 6,718,694 B2   4/2004   Stojc et al.
6,799,393 B2   10/2004  Stephen
8,156,834 B2 * 4/2012   Chiang ............... F16H 25/20
                                                74/89.39

FOREIGN PATENT DOCUMENTS

| CN | 1661195 A | 8/2005 |
| DE | 29612112 U1 | 10/1996 |
| DE | 102012014302 A1 | 5/2014 |
| EP | 0191730 A1 | 8/1986 |
| GB | 9953 | 11/1913 |
| GB | 14274 | 6/1915 |
| GB | 524523 | 8/1940 |
| GB | 2387209 A | 8/2003 |
| WO | 1995009959 A1 | 4/1995 |

* cited by examiner

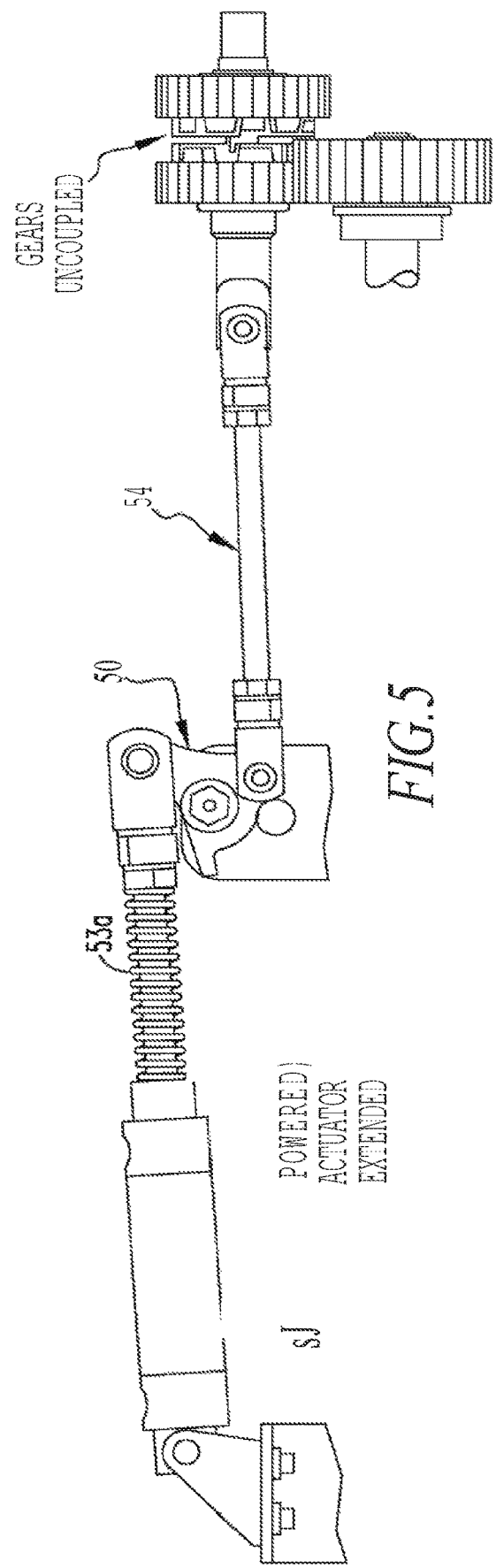

CLUTCH MECHANISM BETWEEN LEADSCREW AND ELECTRIC MOTOR

CROSS REFERENCE TO RELATED APPLICATION

This application claims the benefit of U.S. Provisional Application No. 62/069,953, filed Oct. 29, 2014, which is incorporated herein by reference.

BACKGROUND OF THE INVENTION

Field of the Invention

This patent is directed to a clutch mechanism between a leadscrew and an electric motor for driving the leadscrew. It is particularly useful for enabling the manual opening of sliding plug doors on a public transit vehicle, such as a passenger bus. Such sliding doors are driven to open and close by alternate rotation of the leadscrew.

Description of Related Art

Sliding plug doors for transit vehicles are described in detail in U.S. Pat. No. 6,032,416 entitled "Transit Vehicle Door" assigned to the same assignee as the present invention.

As can be understood from the above-referenced prior art patent, outside sliding plug doors on a transit vehicle are actuated by use of an electric motor coupled to a leadscrew and nut drive usually through a gearbox. The leadscrew and nut drive a door carriage mounted on a linear slide. The disadvantage of this system is that when the doors need to be opened manually, such as in an emergency, the motor and gearbox are not decoupled from the leadscrew. Therefore, the door or doors can only be back driven while forcing turning of the leadscrew. This requires a strong manually applied force.

It is an advantage according to this invention to provide a clutching mechanism inserted between the output of the electric motor and gearbox and the leadscrew facilitating the emergency manual opening of the sliding doors.

SUMMARY OF THE INVENTION

Briefly according to this invention, a clutch mechanism between the rotatable output shaft of an electric motor fixed to a base and a leadscrew rotatably journaled to the base comprises a leadscrew gear, a drive gear mounted to rotate with the output shaft of the electric motor, axially slidable dog-clutch gear directly or indirectly driving the leadscrew, said axially slidable dog-clutch gear having a plurality of dog teeth axially extending away from the leadscrew and circumferentially spaced on the face of the axially slidable dog-clutch gear, said face being perpendicular to the rotating axis of the gear, said axially slidable dog-clutch gear having gear teeth on the circumference for engaging the gear teeth on the leadscrew gear, a axially fixed dog-clutch gear for engaging or disengaging the slidable dog-clutch gear, said fixed dog-clutch gear having a plurality of dog teeth axially extending toward the leadscrew and circumferentially spaced on the face of the fixed dog-clutch gear, said face being perpendicular to the rotating axis of the gear, said fixed dog-clutch having gear teeth on the circumference for engaging the gear teeth on the drive gear, a bell crank being rotatably mounted to the base, said bell crank having extensions in at least two radial directions, a linear actuator having a shaft extending from a first end thereof, said linear actuator being pivotally mounted to the base at the other end, said linear actuator having a biasing means for extending the shaft when not powered, the shaft of the linear actuator being pivotally connected to an extension of the bell crank, and a linkage shaft pivotally connected at one end to an extension of the bell crank and connected via a universal joint connection at the other end to the slidable dog-clutch. When the linear actuator is unpowered, the linkage shaft due to the biasing means in the linear actuator forces the disengagement of dog teeth on the dog-clutch gears enabling the emergency manual opening of the sliding doors.

Preferably, the dog teeth on the dog-clutch gears have planar contact faces that taper radially toward the axis and also in the direction of the axis, the dog teeth thus narrowing moving away from the face of the dog-clutch gears to facilitate disengagement.

Preferably, the linkage shaft and the linear actuator shaft are pivotally connected to the bell crank angularly spaced more than 90 degrees and less than 180 degrees such that at one stop position when the dog-gears are coupled, the axis of the linkage shaft passes centrally through the bell crank, and in a second position when the dog-gears are uncoupled, the axis of the linkage shaft pass through an outer edge of the bell crank.

BRIEF DESCRIPTION OF THE DRAWINGS

Further features and other objects and advantages will become clear from the following detailed description made with references to the drawings in which:

FIG. 5 is a view showing the entire clutch mechanism according to this invention in the uncoupled position.

DESCRIPTION OF THE INVENTION

Figure 1:
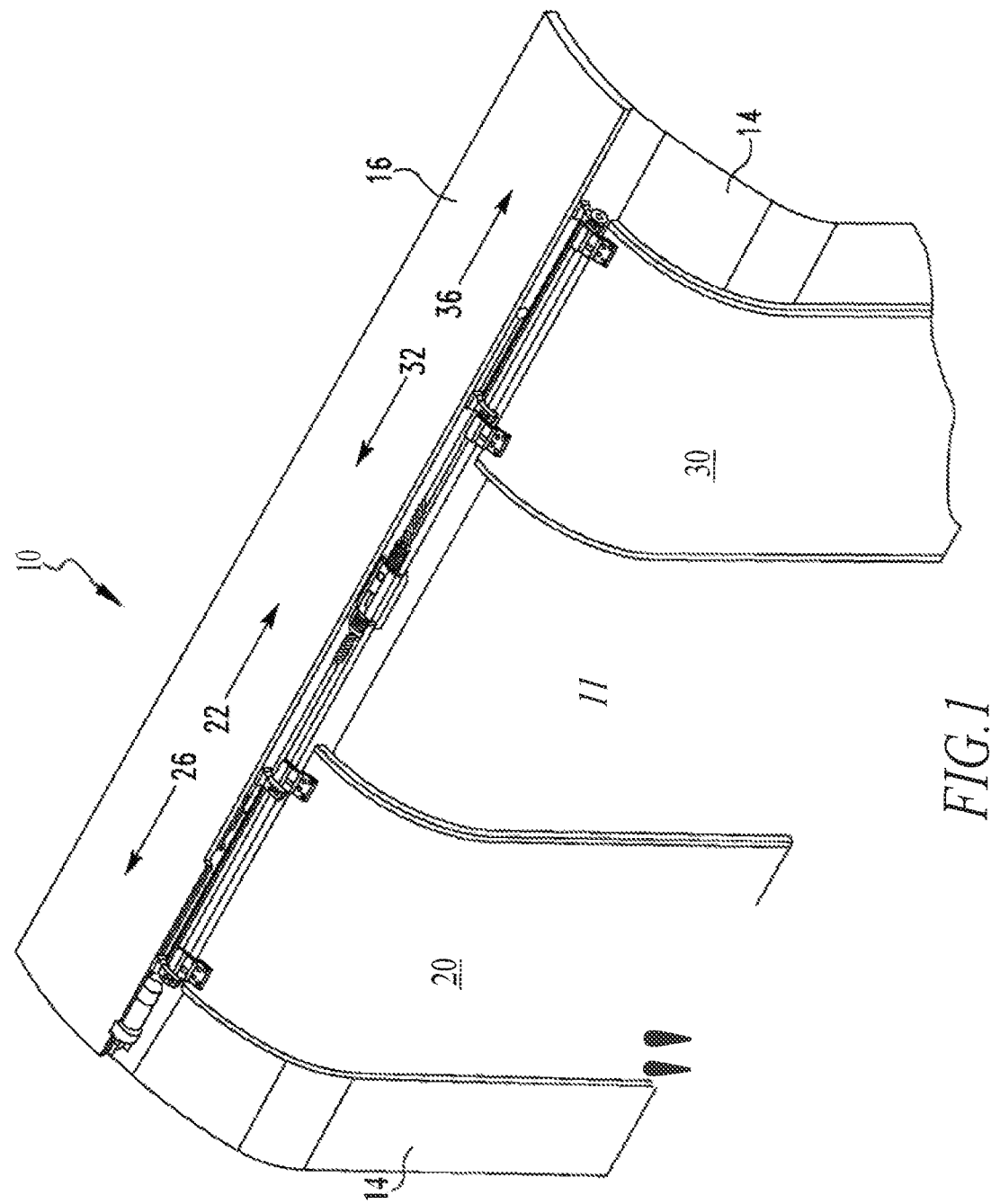
FIG. 1 shows a pair of bi-parting doors in a wall of a transit vehicle according to the prior art with a direct connection between the electric motor and the leadscrew.

FIG. 1 shows, by way of background, a transit vehicle door system, generally designated 10, for covering and uncovering an aperture 12 for ingress and egress of passengers in a wall 14 of a transit vehicle 16. The door system 10 has a first door 20 mounted for movement in a first door closing direction 22 to a first door closed position at least partially covering aperture 12 and for movement in a first door opening direction 26 to a first door open position at least partially uncovering aperture 12, the first door opening direction 26 being opposite to the first door closing direction 22.

Figure 2:
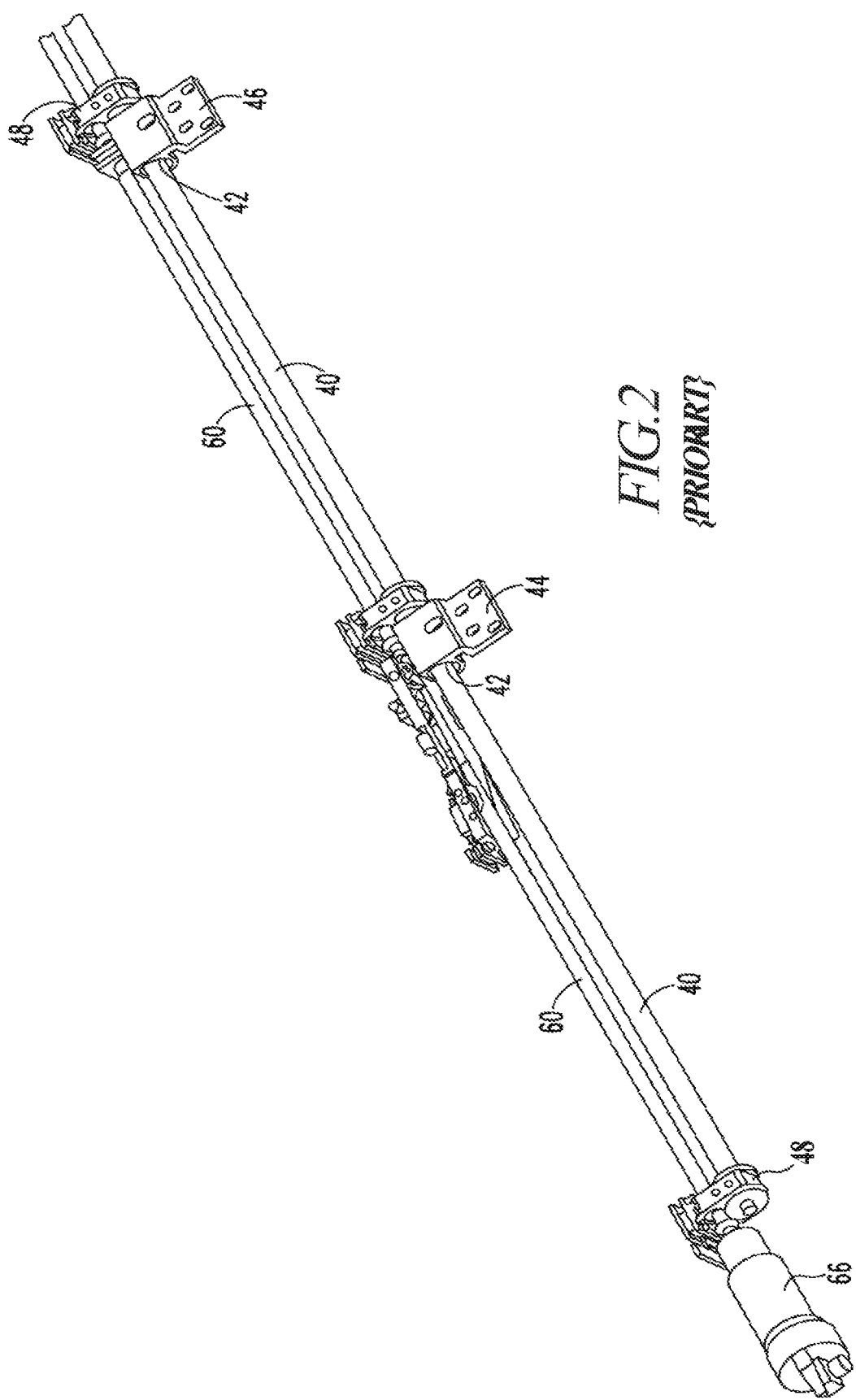
FIG. 2 shows, for a single door, a motor, leadscrew, support rod and hangers, door hangers and lock assembly according to the prior art with a direct connection between the electric motor and the leadscrew.

FIGS. 1 and 2, by way of background, show door 20 suspended from a rod 40 by sliding connections 42 on a first door outer hanger 44 and a first door inner hanger 46, rod 40 being oriented about in a longitudinal direction of the transit vehicle 16. Rod 40 is suspended from a rod hanger 48. Contacting surfaces of rod 40 and sliding connections 42 of door hangers 44 and 46 should be smooth and preferably include low friction materials.

Door system 10 also has a second door 30 connected to a drive leadscrew 60 for longitudinal movement opposite to the first door 20, the second door 30 moving in a second door closing direction 32 to a second door closed position at least partially covering aperture 12 when first door 20 moves in the first door closing direction 22, and second door 30 moving in a second door opening direction 36 to a second door open position at least partially uncovering aperture 12 when first door 20 moves in the first door opening direction 26. The second door closing direction 32 is generally opposite to the first door closing direction 22 and the second door opening direction 36 is generally opposite to the first door opening direction 26. Hence, the first door 20 and the second door 30 cooperate to cover and uncover the aperture 12, as shown in FIGS. 1 and 2. A leadscrew 60 includes a nut assembly (not shown) for the first door 20 and a nut assembly (not shown) for the second door 30. The nut assemblies turning on the leadscrew interconnect with the respective doors to carry the doors to the open or closed positions depending on the rotation direction of the leadscrew driven by an electric motor 66.

Figure 3:
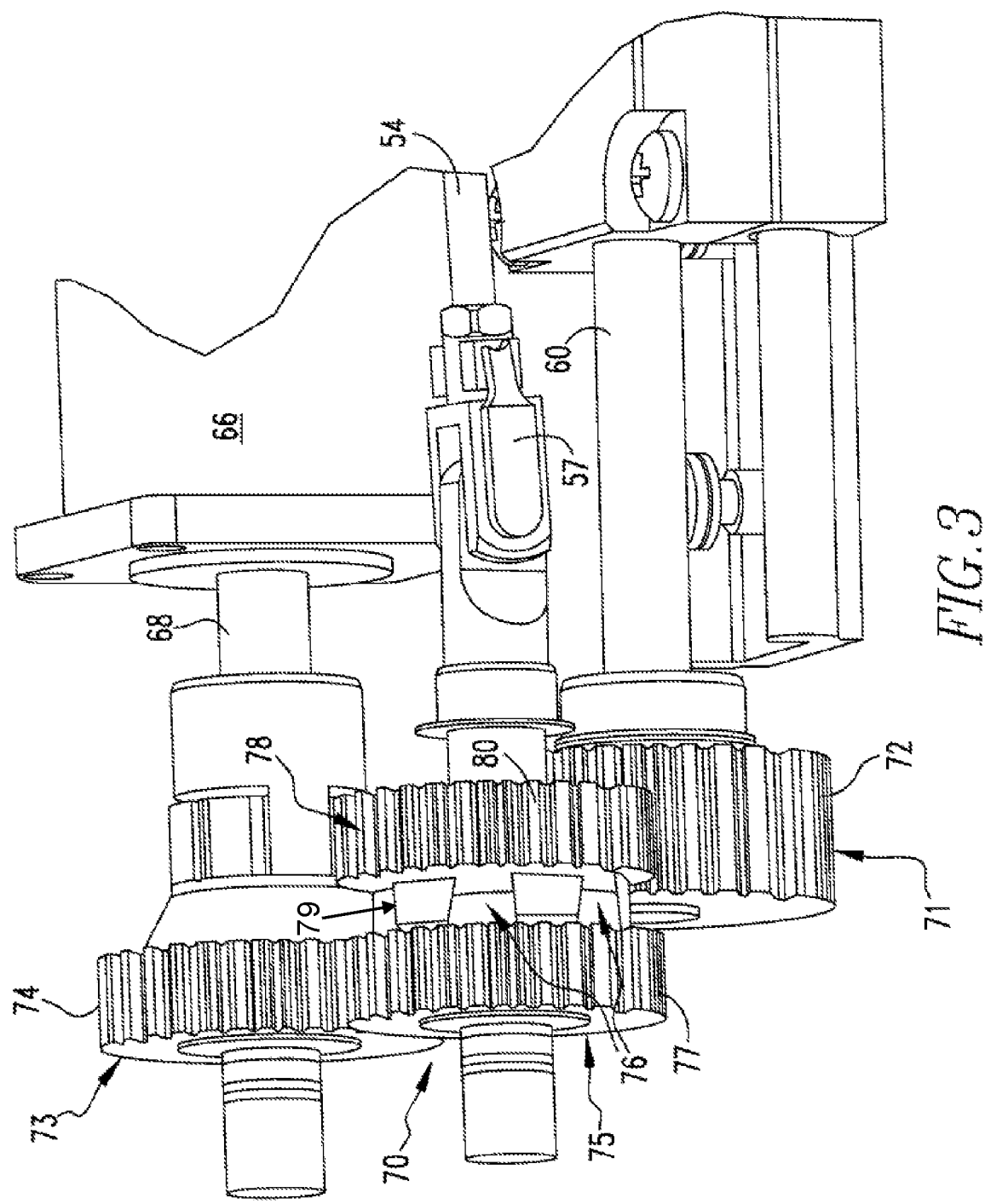
FIG. 3 is a perspective view of gears comprising the clutch mechanism between the leadscrew and electric motor according to this invention.

Referring now to FIG. 3, a clutch mechanism 70 is positioned between a rotatable output shaft 68 of the electric motor 66 fixed to a base and the leadscrew 60 rotatably journaled to the base. The base is either the vehicle wall 14 or a structure fixed relative to the vehicle wall.

A leadscrew gear 71 has a plurality of wide gear teeth 72 spaced on the circumference. The leadscrew gear is mounted to rotate with the leadscrew.

A drive gear 73 has a plurality of gear teeth 74 spaced on the circumference, said drive gear mounted to rotate with the output shaft 68 of the electric motor 66.

An axially fixed dog-clutch gear 75 directly or indirectly drives the leadscrew. The fixed dog-clutch gear 75 has a plurality of dog teeth 76 axially extending away from and circumferentially spaced on the face of the fixed dog-clutch gear. The face is perpendicular to the rotating axis of the gear. The fixed dog-clutch gear 75 has gear teeth 77 on the circumference for engaging the gear teeth 74 on the drive gear 73.

An axially sliding dog-clutch gear 78 is secured axially slidable relative to the base for engaging or disengaging the fixed dog-clutch gear 75. The slidable dog-clutch gear 78 has a plurality of dog teeth 79 axially extending and circumferentially spaced on the face of the slidable dog-clutch gear. The face is perpendicular to the rotating axis of the gear. The slidable dog-clutch 78 has gear teeth 80 on the circumference for engaging the wide gear teeth 72 on the lead screw gear 71.

The sliding dog-clutch gear 78 and the fixed dog-clutch gear 75 are attached to a sliding shaft and fixed axle, respectively. They rotate due to bearings affixed between them and the shaft or axle.

Figure 4:
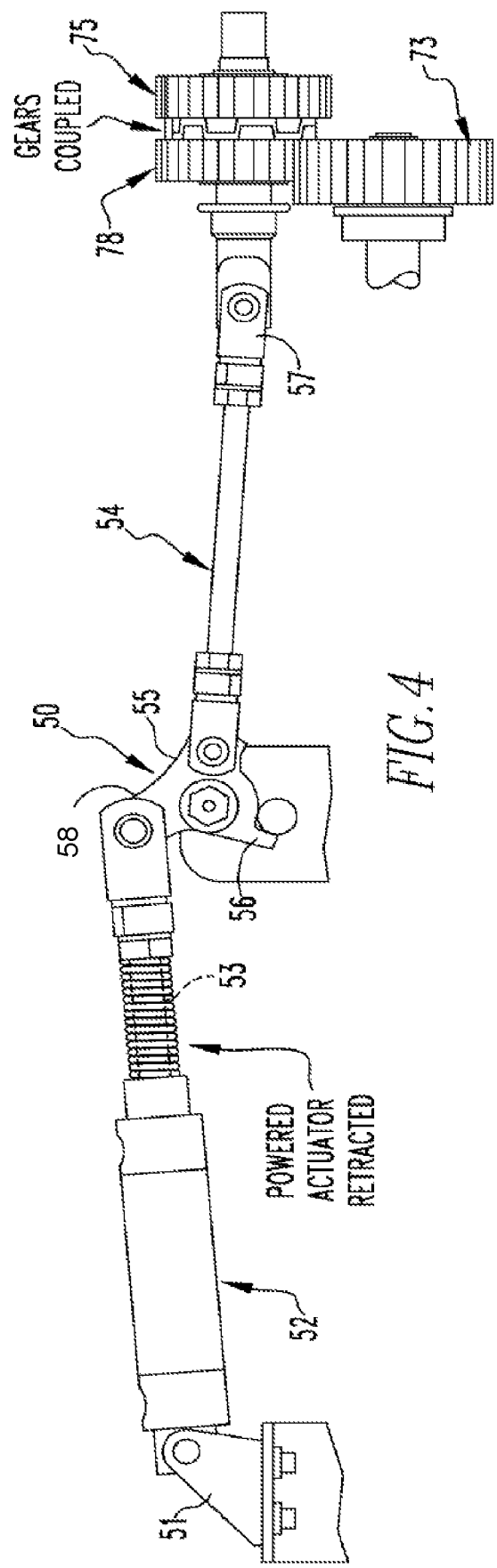
FIG. 4 is a view showing the entire clutch mechanism according to this invention including the linear actuator, bell crank, and linkage shaft in the coupled position.

Referring now to FIGS. 4 and 5, a bell crank 50 is rotatably mounted to the base. The bell crank has extensions in at least two radial directions. A linear actuator 52 has a shaft 53 extending from a first end of the actuator. The linear actuator 52 is pivotally mounted at an extension 51 to the base at the other end. The linear actuator 52 has a biasing means, for example, a coil spring 53a, for extending the shaft 53 out of the actuator when not powered. The actuator shaft 53 is pivotally connected to an extension 58 of the bell crank 50. The actuator 52 may be powered, for example, by an electrical solenoid. When the actuator is unpowered, the biasing means extends shaft 53.

A linkage shaft 54 is pivotally connected at one end to an extension 55 of the bell crank 50 and connected via a universal joint 57 at the other end to the second dog-clutch gear 78. Thus, when the linear actuator is unpowered, the linkage shaft 54 due to the biasing means in the linear actuator extends the shaft 53 and rotates the bell crank 50 withdrawing the linkage shaft 54 forcing the disengagement of dog teeth on the first dog-clutch gear 75 and the second dog-clutch gear 78 enabling the manual opening of the door.

According to a preferred embodiment, the dog teeth on the dog-clutch gears have planar contact faces that taper radially toward the axis and also in the direction of the axis. The dog teeth thus narrow moving away from the face of the dog-clutch gears to facilitate disengagement. However, as the dog teeth on both dog-clutch gears meet on a plane inclined to the direction of motion, there exists a small axial force urging separation of the dog-clutch gears.

According to another preferred embodiment, the linkage shaft 54 and the linear actuator shaft 53 are pivotally connected to the bell crank 50 angularly spaced more than 90 degrees and less than 180 degrees about the axis of the bell crank 50 such that at one stop position as shown in FIG. 4 when the dog-gears are coupled, the axis of the linkage shaft 54 passes centrally through the bell crank 50. In a second position when the dog-gears are uncoupled, as shown in FIG. 5, the axis of the linkage shaft 54 passes near an outer edge of the bell crank 50. The bell crank has a third extension 56 engaging a stop fixed to the base when the bell crank 50 has rotated to the coupled position.

In the coupled position, an uncoupling force transmitted through the linkage shaft 54 thus can apply a very small, if any, moment force to rotate the bell crank 50. On the other hand, in the coupled position, the moment force exerted though the actuator shaft 53 to resist uncoupling is maximum.

Having thus described our invention with the detail and particularity required by the Patent Laws, what is desired protected by Letters Patent is set forth in the following claims.

The invention claimed is:

1. A clutch mechanism between a rotatable output shaft of an electric motor fixed to a base and a leadscrew rotatably journaled to the base, the clutch mechanism comprising:
   a leadscrew gear having a plurality of wide gear teeth spaced on a circumference of the leadscrew gear, the leadscrew gear mounted to rotate with the leadscrew;
   a drive gear having a plurality of first gear teeth spaced on a circumference of the drive gear, the drive gear mounted to rotate with the output shaft of the electric motor;
   an axially slidable dog-clutch gear directly or indirectly driving the leadscrew, the slidable dog-clutch gear having a first plurality of dog teeth axially extending away from the leadscrew and circumferentially spaced on a face of the slidable dog-clutch gear, the face being perpendicular to a rotating axis of the slidable dog-clutch gear, the slidable dog-clutch gear having second gear teeth on a circumference of the slidable dog-clutch gear for engaging the wide gear teeth on the leadscrew gear;
   an axially fixed dog-clutch gear for engaging or disengaging the axially slidable dog-clutch gear, the fixed dog-clutch gear having a second plurality of the dog teeth axially extending toward the leadscrew and circumferentially spaced on a face of the fixed dog-clutch gear, the face of the fixed dog-clutch gear being perpendicular to the rotating axis of the slidable dog-clutch gear, the fixed dog-clutch having third gear teeth on a circumference of the fixed dog-clutch gear for engaging the first gear teeth on the drive gear;

a bell crank being rotatably mounted to the base, the bell crank having first and second extensions in at least two radial directions;

a linear actuator having a shaft extending from a first end thereof, the linear actuator being pivotally mounted to the base at an opposite, second end, the linear actuator having a biasing means for extending the shaft when not powered, the shaft of the linear actuator being pivotally connected to the first extension of the bell crank; and a linkage shaft pivotally connected at a first end of the linkage shaft to the second extension of the bell crank and connected via a universal joint connection at an opposite, second end of the linkage shaft to the slidable dog-clutch gear, wherein, when the linear actuator is unpowered, the linkage shaft forces disengagement of the first plurality of the dog teeth on the slidable dog-clutch gear from the second plurality of the dog teeth on the fixed dog-clutch gear due to the biasing means in the linear actuator, thereby enabling an emergency manual opening of a sliding door.

2. The clutch mechanism according to claim 1, wherein the first plurality of the dog teeth on the slidable dog-clutch gear and the second plurality of the dog teeth on the fixed dog-clutch gear have planar contact faces that taper radially toward the rotating axis and also in a direction of the rotating axis, the dog teeth thus narrowing moving away from the faces of the slidable and fixed dog-clutch gears to facilitate disengagement.

3. The clutch mechanism according to claim 1, wherein the linkage shaft and the shaft of the linear actuator are pivotally connected to the bell crank and angularly spaced apart by more than 90 degrees and less than 180 degrees such that, at one stop position when the slidable and fixed dog-gears are coupled, an axis of the linkage shaft passes centrally through the bell crank and, in a second position when the slidable and fixed dog-gears are uncoupled, the axis of the linkage shaft passes through an outer edge of the bell crank.

4. The clutch mechanism according to claim 3, wherein the bell crank has a third extension engaging a stop fixed to the base when the bell crank has rotated to a coupled position.

\* \* \* \* \*